(12) United States Patent
Chen et al.

(10) Patent No.: US 10,379,432 B2
(45) Date of Patent: Aug. 13, 2019

(54) PROJECTOR AND PROJECTING METHOD USING THE SAME

(71) Applicants: BenQ CO., LTD., Shanghai (CN); BENQ CORPORATION, Taipei (TW)

(72) Inventors: Chiu-Ping Chen, New Taipei (TW); Chen-Cheng Huang, Taoyuan (TW)

(73) Assignees: BenQ Intelligent Technology (Shanghai) Co., Ltd, Shanghai (CN); BenQ CORPORATION, Taipei (TW)

( * ) Notice: Subject to any disclaimer, the term of this patent is extended or adjusted under 35 U.S.C. 154(b) by 295 days.

(21) Appl. No.: 15/627,544

(22) Filed: Jun. 20, 2017

(65) Prior Publication Data

US 2018/0024426 A1    Jan. 25, 2018

(30) Foreign Application Priority Data

Jul. 22, 2016    (CN) .......................... 2016 1 0580339

(51) Int. Cl.
*G03B 21/20* (2006.01)
*G03B 21/00* (2006.01)
*H04N 9/31* (2006.01)
*G03B 33/12* (2006.01)

(52) U.S. Cl.
CPC ......... *G03B 21/204* (2013.01); *G03B 21/008* (2013.01); *G03B 21/2066* (2013.01); *H04N 9/3111* (2013.01); *H04N 9/3158* (2013.01); *H04N 9/3164* (2013.01); *G03B 33/12* (2013.01)

(58) Field of Classification Search
CPC .......................... G03B 21/008; G03B 21/204; G03B 21/2066; H04N 9/3111; H04N 9/3154; H04N 9/3158
See application file for complete search history.

(56) References Cited

U.S. PATENT DOCUMENTS 9,664,892 B2 *  5/2017  King ..................... G02B 26/008
10,156,729 B2 * 12/2018  Chang .................. G02B 27/141

FOREIGN PATENT DOCUMENTS

TW          201530062        8/2015

OTHER PUBLICATIONS

Office action of counterpart application by Taiwan IP Office dated Dec. 14, 2016.

* cited by examiner

*Primary Examiner* — Thomas M Sember

(57) ABSTRACT

A projector and a projecting method using the same are provided. The projector includes a first light source, a color wheel and a second light source. The first light source is configured to emit a first color light. The second light source is configured to emit a second color light. The first color light passing through a transparent region of the color wheel becomes a third color light. The second color light and the third color light are mixed as a first projecting light. The first color light reflected by a phosphor reflection region of the color wheel becomes a fourth color light. The fourth color light is guided toward a projecting direction to become a second projecting light. The first projecting light and the second projecting light do not overlap in timing.

19 Claims, 4 Drawing Sheets

PROJECTOR AND PROJECTING METHOD USING THE SAME

This application claims the benefit of People's Republic of China application Serial No. 201610580339.2, filed Jul. 22, 2016, the subject matter of which is incorporated herein by reference.

BACKGROUND OF THE INVENTION

Field of the Invention

The invention relates in general to a projector and a projecting method using the same, and more particularly to a projector whose two projecting lights do not overlap in timing and a projecting method using the same.

Description of the Related Art

The light source of a conventional projector emits a color light having a specific light color. When the specific color light is excited by the phosphor reflection region of the color wheel, the specific color light is converted into different light colors and is projected onto the screen. After specific color light passing through the transparent region of the color wheel, the specific color light is also projected onto the screen.

However, due to the design and manufacturing problems, the light color of the specific color light emitted by the light source may deviate from an expected light color and generate color shift in the display image.

Therefore, it has become a prominent task for the industry to provide a new technology capable of resolving the generally-known problems.

SUMMARY OF THE INVENTION

The invention is directed to a projector and a projecting method using the same capable of resolving the generally-known problems.

According to one embodiment of the present invention, a projector is provided. The projector includes a first light source, a color wheel and a second light source. The first light source is configured to emit a first color light. The color wheel includes at least one transparent region and at least one phosphor reflection region. The second light source is configured to emit a second color light. The color wheel is located on a first optical path of the first color light. The first color light passing through at least one transparent region of the color wheel becomes a third color light. The first color light reflected by at least one phosphor reflection region of the color wheel becomes a fourth color light. The second color light is only mixed with the third color light and simultaneously guided toward a projecting direction to become a first projecting light. The fourth color light is guided toward a projecting direction to become a second projecting light. The first projecting light and the second projecting light do not overlap in timing.

According to another embodiment of the present invention, a projecting method is provided. The projecting method includes following steps. A projector including a first light source, a second light source and a color wheel is provided, wherein the color wheel includes at least one transparent region and at least one phosphor reflection region, and the color wheel is located on a first optical path of a first color light. The first color light is emitted by the first light source, wherein the first color light reflected by a phosphor reflection region of the color wheel becomes a fourth color light. The fourth color light is guided towards projecting direction to become a second projecting light. The first color light is emitted by the first light source, wherein the first color light passing through at least one transparent region of the color wheel becomes a third color light. A second color light is emitted by the second light source. The second color light and the third color light are guided towards a projecting direction to be mixed as a first projecting light, wherein the second projecting light and the first projecting light do not overlap in timing.

The above and other aspects of the invention will become better understood with regard to the following detailed description of the preferred but non-limiting embodiment (s). The following description is made with reference to the accompanying drawings.

DETAILED DESCRIPTION OF THE INVENTION

Figure 1A:
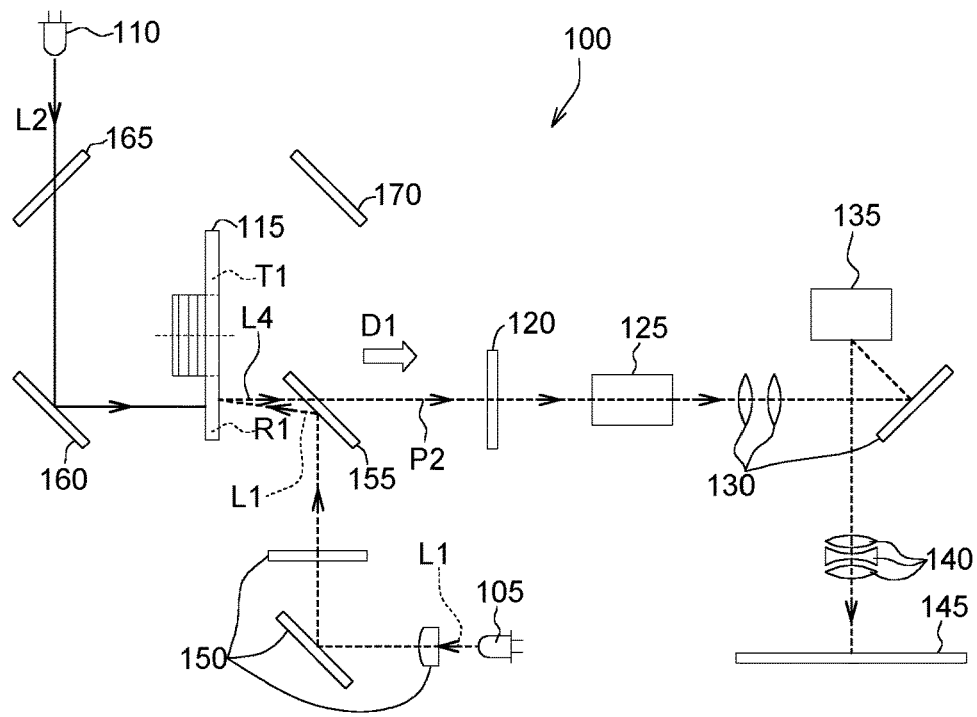
FIG. 1A is a schematic diagram of a projector at a first timing according to of the present invention an embodiment.
Figure 1B:
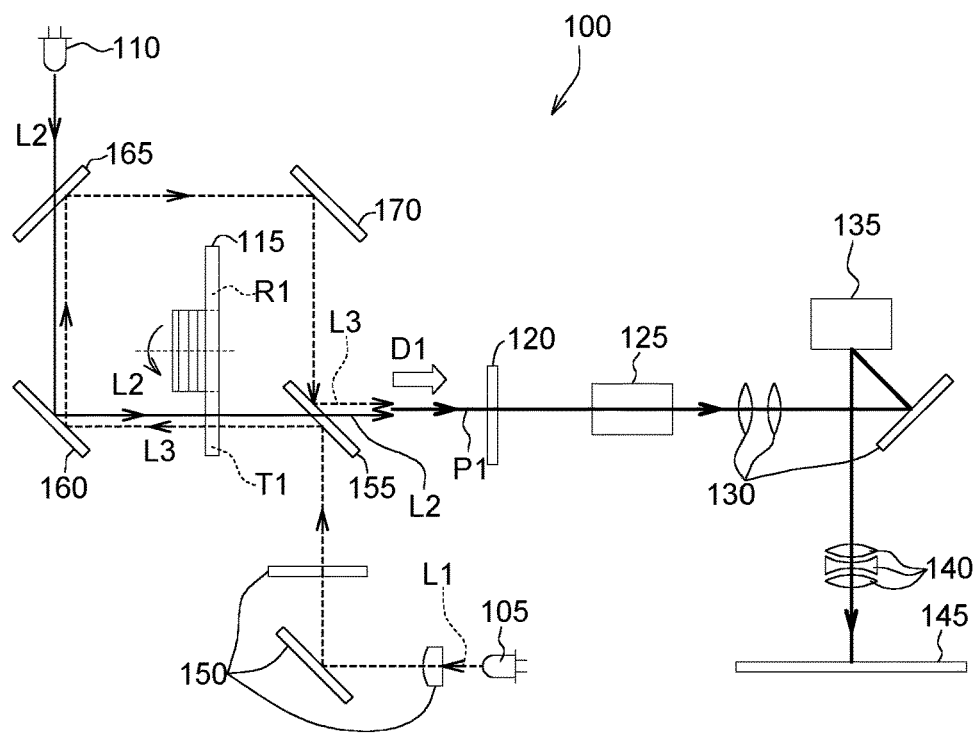
FIG. 1B is a schematic diagram of the projector of FIG. 1A at a second timing.

Refer to FIGS. 1A and 1B. FIG. 1A is a schematic diagram of a projector 100 at a first timing according to of the present invention an embodiment. FIG. 1B is a schematic diagram of the projector 100 of FIG. 1A at a second timing.

The projector 100 includes a first light source 105, a second light source 110, a first color wheel 115, a second color wheel 120, a light guide tube 125, a first lens group 130, a digital micro-mirror display (DMD) 135, a second lens group 140, a third lens group 150, a second dichroic mirror 155, a first reflector 160, a first dichroic mirror 165, and a second reflector 170. The first light source 105 emits a first color light L1 (denoted by dotted lines). The first light source 105 can be realized by a blue light laser emitter, therefore the first color light L1 is a blue light laser. In an embodiment, the first color light L1 has a wavelength between 420~450 nanometers (nm). The second light source 110 emits a second color light L2 (denoted by solid lines). The second light source 110 can be realized by a light emitting diode, such as a green light diode, which makes the second color light L2 a green light. The second color light L2 has a wavelength between 490~530 nm. Furthermore, the first color light L1 can be any color lights other than the blue light, and the second color light L2 can be any color lights other than the green light. Color selection of the second color light L2 is based on the color of the first color light L1 and/or the color of the first projecting light P1, and is not subjected to specific restrictions in the embodiments of the present invention.

Besides, the second light source 110 can be realized by a light emitting diode package, which includes a diode (not illustrated) and a wavelength conversion layer (not illustrated) covering the diode. The wavelength conversion layer converts the light emitted by the diode into the second color light L2. Or, the second light source 110 emits a color light, which is different from the second color light but can be converted into the second color light L2 by a wavelength conversion element, wherein the wavelength conversion element and the second light source 110 are disposed separately and do not contact each other.

The first color wheel 115 includes at least one transparent region T1 and at least one phosphor reflection region R1. The transparent region T1 allows the first color light L1 to pass through and maintain its original color light. The phosphor reflection region R1 changes the wavelength of the first color light L1, and therefore converts the first color light L1 into a fourth color light L4 and further reflects the fourth color light L4, wherein the fourth color light L4 is different from the first color light L1.

The phosphor reflection region R1 can be realized by at least one of a red light reflective region, a green light reflective region, a blue light reflective region and a yellow light reflective region. The first color wheel 115 is located on a first optical path of the first color light L1. The first color wheel 115 rotates and makes the transparent region T1 and the phosphor reflection region R1 aligned with the first color light L1 at different timings. For example, at the first timing, as indicated in FIG. 1A, the first color wheel 115 is aligned with the first color light L1 by the phosphor reflection region R1; at the second timing, as indicated in FIG. 1B, the first color wheel 115 is aligned with the first color light L1 by the transparent region T. The first timing and the second timing are two continued timings or two discontinued timings separated by other timing(s).

As indicated in FIG. 1A, at the first timing, the first color light L1 reflected the phosphor reflection region R1 of the first color wheel 115 becomes a fourth color light L4 (denoted by dotted lines). The fourth color light L4 is guided towards a projecting direction D1 to become a second projecting light P2. Then, the second projecting light P2 sequentially passes through the second color wheel 120, the light guide tube 125, the first lens group 130, DMD 135, and the second lens group 140 to display an image on the screen 145.

As indicated in FIG. 1B, at the second timing, the first color wheel 115 rotates and makes the transparent region T1 aligned with the first color light L1, and the first color light L1 passing through the transparent region T1 becomes a third color light L3 (denoted by dotted lines). Then, the second color light L2 and the third color light L3 are guided toward a projecting direction D1 to be mixed as a first projecting light P1, as indicated in FIG. 1B. The first projecting light P1 sequentially passes through the second color wheel 120, the light guide tube 125, the first lens group 130, the DMD 135, and the second lens group 140 to display an image on the screen 145. Since the second color light L2 and the third color light L3 are mixed, the second color light L2 can compensate the color of the third color light L3 (or the first color light L1). Let the second color light L2 be a green light, and the third color light L3 be a blue light. The second color light L2 makes the wavelength of the mixed first projecting light P1 cover the wavelength range of the third color light L3 and the wavelength range of the second color light L2. Due to the design or manufacturing problems, the first light source 105 (such as a blue light laser) may cause the projecting light to be deviated from an expected light color. Normally, the light color of the blue light is shifted towards velvet. The second color light L2 (such as a green light) of the present embodiment can compensate the light color of the third color light L3 (or the first color light L1) (such as a blue light), and compensate the light color of the mixed first projecting light P1 to an expected light color.

As disclosed above, the first projecting light P1 and the second projecting light P2 do not overlap in timing. In other words, the first projecting light P1 and the second projecting light P2 are not generated concurrently, but are generated at different time points under the control of the first color wheel 115.

As indicated in FIG. 1B, the first color wheel 115 is located on the first optical path of the first color light L1 and the second optical path of the second color light L2; the second color light L2 and the third color light L3 pass through the transparent region T1 of the first color wheel 115 in opposite directions. In the present embodiment, regardless of the rotation angle or timing of the first color wheel 115, the second light source 110 continuously emits a second color light L2. In another embodiment, the second light source 110 does not emit the second color light L2 when the transparent region T1 of the first color wheel 115 is not aligned with the first color light L1; the second light source 110 emits the second color light L2 only when the transparent region T1 of the first color wheel 115 rotates to be aligned with the first color light Lt.

The optical elements through which the first optical path of the first color light L1, the second optical path of the second color light L2, the third optical path of the third color light L3 and the fourth optical path of the fourth color light L4 pass are disclosed below.

As indicated in FIG. 1A, at the first timing, the first optical path of the first color light L1 sequentially passes through the third lens group 150 having a reflector, the second dichroic mirror 155 and the first color wheel 115; the fourth optical path of the fourth color light L4 sequentially passes through the first color wheel 115 and the second dichroic mirror 155. The second dichroic mirror 155 reflects the first color light L1 but allows the fourth color light L4 to pass through, such that the first color light L1 is reflected to the first color wheel 115 by the second dichroic mirror 155, and then is converted into a fourth color light L4 by the phosphor reflection region R1 of the first color wheel 115. Then, the fourth color light L4 reflected to the second dichroic mirror 155 by the phosphor reflection region R1 passes through the second dichroic mirror 155 to reach the second color wheel 120.

As indicated in FIG. 1B, at the second timing, the first optical path of the first color light L1 sequentially passes through the second dichroic mirror 155 and the transparent region T1 of the first color wheel 115. The third optical path of the third color light L3 sequentially passes through the first reflector 160, the first dichroic mirror 165, the second reflector 170 and the second dichroic mirror 155. Since the first dichroic mirror 165 and the second dichroic mirror 155 both can reflect the third color light L3, the third color light L3 sequentially reflected by the first dichroic mirror 165 and the second dichroic mirror 155 is guided towards a projecting direction D1.

As indicated in FIG. 1B, at the second timing, the second optical path of the second color light L2 sequentially passes through the first dichroic mirror 165, the first reflector 160, the transparent region T1 of the first color wheel 115 and the second dichroic mirror 155. The first dichroic mirror 165 and the second dichroic mirror 155 both allows the second color light L2 to pass through. Therefore, the second color light L2 sequentially passing through the first dichroic mirror 165 and the second dichroic mirror 155 is guided towards a projecting direction D1.

Moreover, the first dichroic mirror 165, the second dichroic mirror 155, the first reflector 160 and the second reflector 170 can be disposed at the four corners of a quadrilateral. The quadrilateral can be a rectangle or a square. For example, as indicated in FIGS. 1A and 1B, the first dichroic mirror 165 and the second dichroic mirror 155 are disposed corresponding to two corners in a diagonal of a rectangle, and the first reflector 160 and the second reflector 170 are disposed corresponding to two corners in another diagonal of the rectangle to implement the first optical path, the second optical path, the third optical path and the fourth optical path. However, the geometric positions of the second dichroic mirror 155, the first reflector 160, the first dichroic mirror 165, the second reflector 170 and/or other optical elements are not subjected to specific restrictions in the embodiments of the present invention as long as the first optical path, the second optical path, the third optical path and the fourth optical path can be implemented.

Figure 1C:
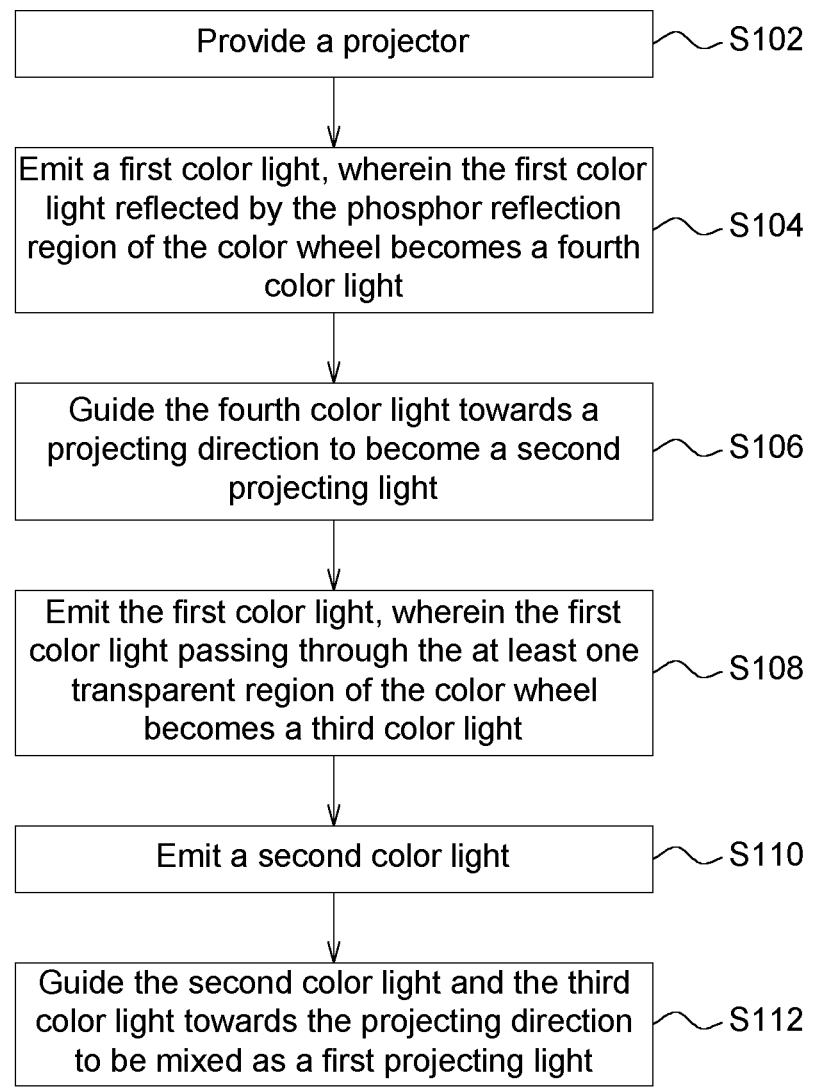
FIG. 1C is a flowchart of a projecting method of the projector of FIG. 1A.

FIG. 1C is a flowchart of a projecting method of the projector 100 of FIG. 1A.

In step S102, a projector 100 is provided.

In step S104, as indicated in FIG. 1A, at the first timing, a first color light L1 is emitted by the first light source 105, wherein the first color light L1 reflected by the phosphor reflection region R1 of the first color wheel 115 becomes a fourth color light L4.

In step S106, as indicated in FIG. 1A, at the first timing, the fourth color light L4 is guided towards a projecting direction D1 by the second dichroic mirror 155 to become a second projecting light P2.

In step S108, as indicated in FIG. 1B, at the second timing, a first color light L1 is emitted by the first light source 105, wherein the first color light L1 passing through the transparent region T1 of the first color wheel 115 becomes a third color light L3.

In step S110, as indicated in FIG. 1B, at the second timing, a second color light L2 is emitted by the second light source 110. In an embodiment, regardless of the rotation angle of the first color wheel 115, the second light source 110 continuously emits a second color light L2, as indicated in FIGS. 1A and 1B. In another embodiment, the second light source 110 does not emit the second color light L2 when the transparent region T1 of the first color wheel 115 is not aligned with the first color light L1; the second light source 110 emits a second color light L2 only when the transparent region T1 of the first color wheel 115 rotates to is aligned with the first color light L1.

In step S112, the second color light L2 and the third color light L3 are guided towards a projecting direction D1 by the first dichroic mirror 165, the first reflector 160, the second dichroic mirror 155 and the second reflector 170 to be mixed as a first projecting light P1, wherein the second projecting light P2 and the first projecting light P1 do not overlap in timing.

Figure 2A:
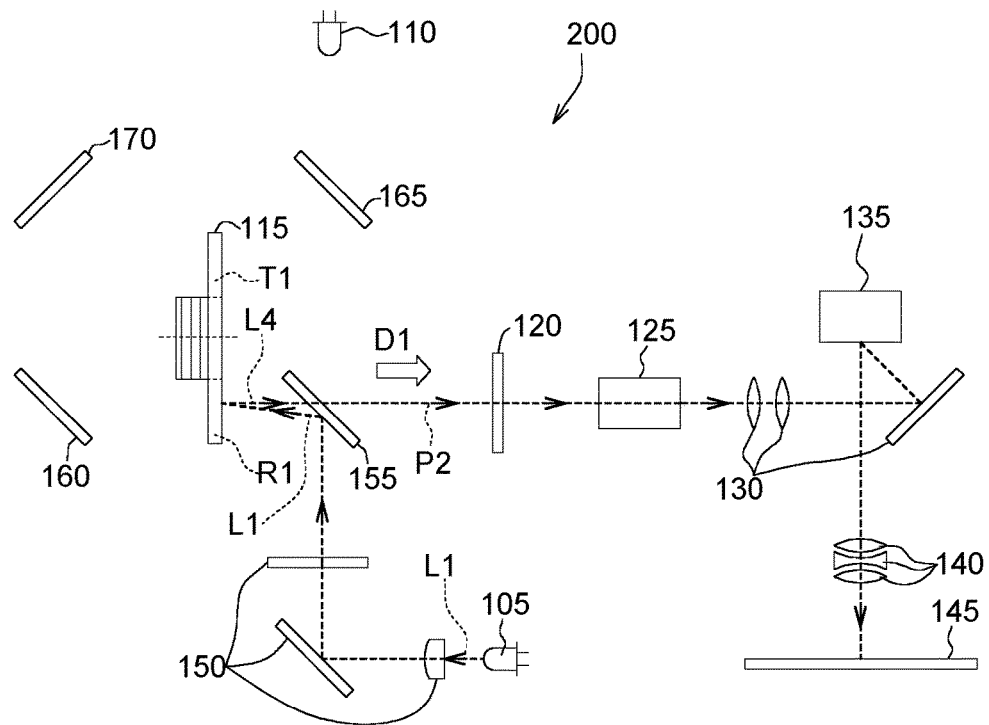
FIG. 2A is a schematic diagram of a projector at a first timing according to according to another embodiment of the present invention.
Figure 2B:
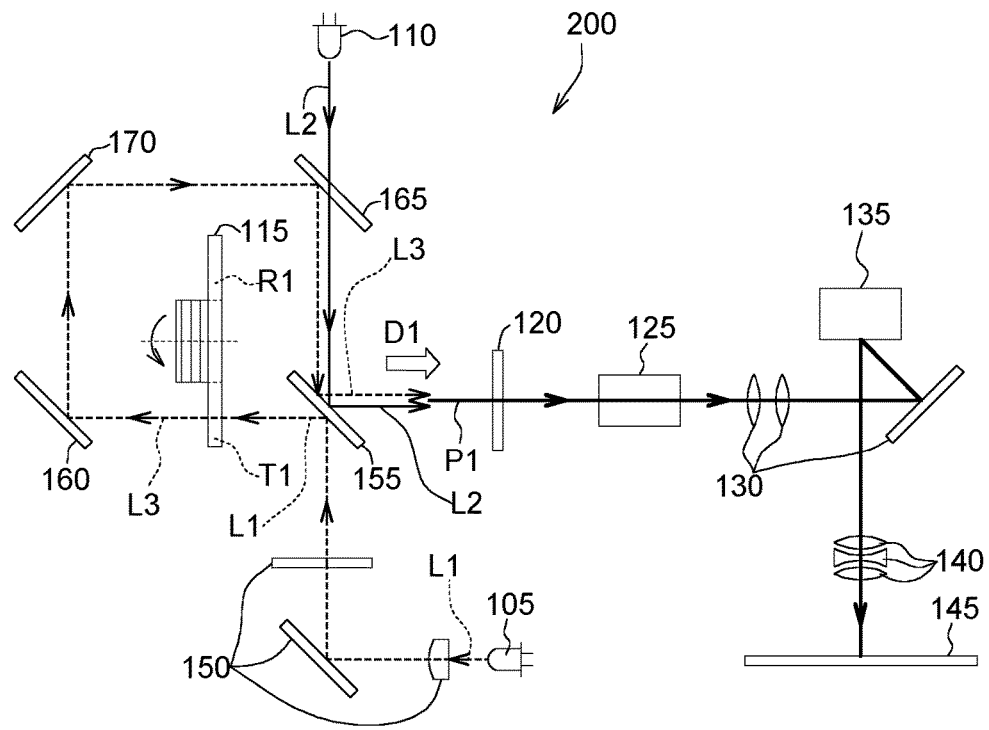
FIG. 2B is a schematic diagram of the projector of FIG. 2A at a second timing.

Refer to FIGS. 2A and 2B. FIG. 2A is a schematic diagram of a projector 200 at a first timing according to according to another embodiment of the present invention. FIG. 2B is a schematic diagram of the projector 200 of FIG. 2A at a second timing.

The projector 200 includes a first light source 105, a second light source 110, a first color wheel 115, a second color wheel 120, a light guide tube 125, a first lens group 130, a DMD 135, a second lens group 140, a third lens group 150, a second dichroic mirror 155, a first reflector 160, a first dichroic mirror 165 and a second reflector 170.

The projector 200 of the present embodiment is different from the projector 100 in that the first color wheel 115 is not located on the second optical path of the second color light L2. That is, the second color light L2 emitted by the second light source 110 does not pass through the first color wheel 115. In the present embodiment, the second light source 110 does not emit the second color light L2 when the transparent region T1 of the first color wheel 115 is not aligned with the first color light L1 as indicated in FIG. 2A. Thus, the second projecting light P2 does not mix with the second color light L2, and therefore will not be affected by the second color light L2. As indicated in FIG. 2B, the second light source 110 emits a second color light L2 only when the transparent region T1 of the first color wheel 115 rotates to be aligned with the first color light L1.

The optical elements through which the first optical path of the first color light L1, the second optical path of the second color light L2, the third optical path of the third color light L3 and the fourth optical path of the fourth color light L4 pass are disclosed below.

As indicated in FIG. 2A, at the first timing, the first optical path of the first color light L1 sequentially passes through the second dichroic mirror 155 and the first color wheel 115; the fourth optical path of the fourth color light L4 sequentially passes through the first color wheel 115 and the second dichroic mirror 155. As indicated in FIG. 2B, at the second timing, the first optical path of the first color light L1 sequentially passes through the second dichroic mirror 155 and the first color wheel 115; the third optical path of the third color light L3 sequentially passes through the first reflector 160, the second reflector 170, the first dichroic mirror 165 and the second dichroic mirror 155; the second optical path of the second color light L2 sequentially passes through the first dichroic mirror 165 and the second dichroic mirror 155.

The second color light L2 and the third color light L3 are guided towards a projecting direction D1 to be mixed as a first projecting light P1. Like the projector 100, the second color light L2 of the projector 200 of the present invention can compensate the light color of the third color light L3 (or the first color light L1).

Moreover, the first dichroic mirror 165, the second dichroic mirror 155, the first reflector 160 and the second reflector 170 are disposed at the four corners of a quadrilateral. The quadrilateral can be a rectangle or a square. As indicated in FIGS. 2A and 2B, the second dichroic mirror 155 and the second reflector 170 are disposed corresponding to two corners in diagonal of a rectangle a diagonal, and the first dichroic mirror 165 and the first reflector 160 are disposed corresponding to two corners in another diagonal of the rectangle to implement the first optical path, the second optical path, the third optical path and the fourth optical path. However, the geometric positions of the second dichroic mirror 155, the first reflector 160, the first dichroic mirror 165, the second reflector 170 and/or other optical element are not subjected to specific restrictions in the embodiments of the present invention as long as the first optical path, the second optical path, the third optical path and the fourth optical path can be implemented.

The flowchart of the projecting method of the projector 200 of the present invention is similar to that of FIG. 1C except steps S104 and S108. In step S104, the second light source 110 does not emit the second color light L2 when the transparent region T1 of the first color wheel 115 is not aligned with the first color light L1 as indicated in FIG. 2A. In step S108, the second light source 110 emits a second color light L2 only when the transparent region T1 of the first color wheel 115 is aligned with the first color light L1 as indicated in FIG. 2B.

Figure 3A:
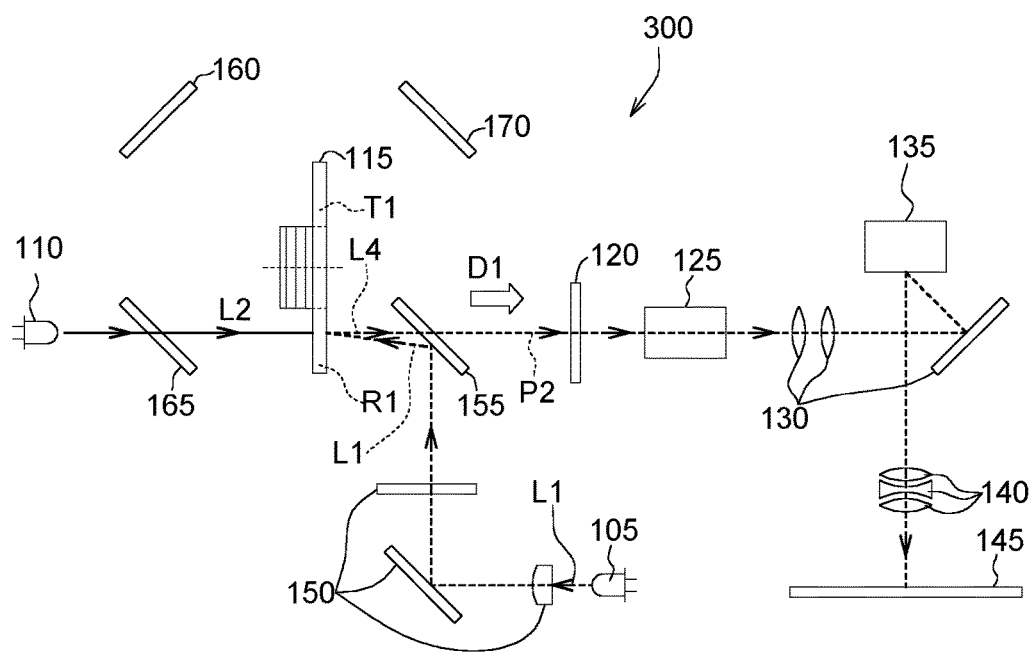
FIG. 3A is a schematic diagram of a projector at a first timing according to according to another embodiment of the present invention.
Figure 3B:
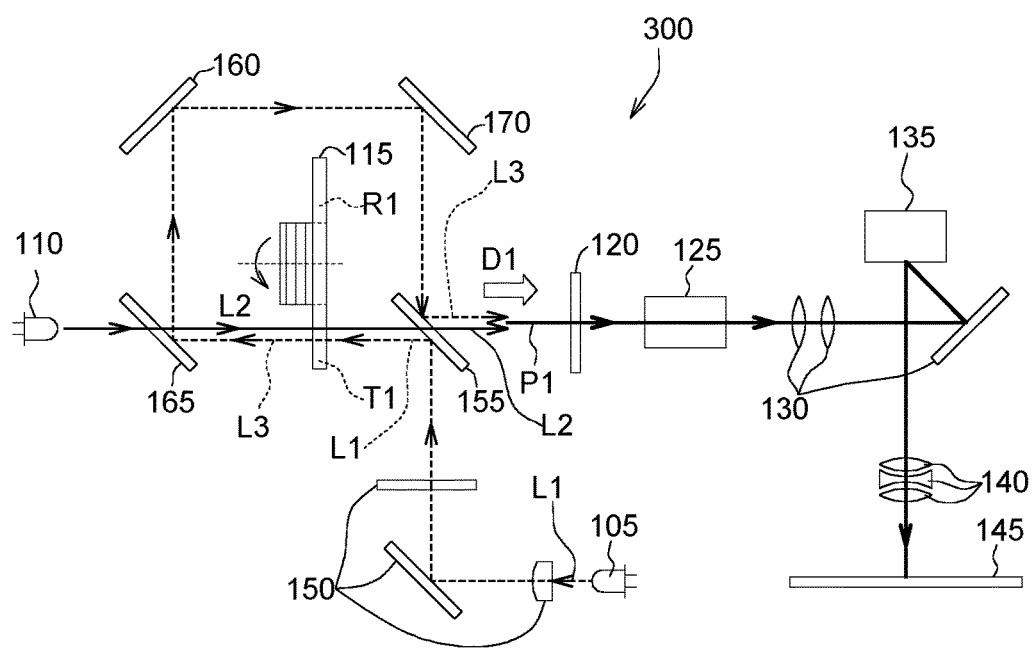
FIG. 3B is a schematic diagram of the projector of FIG. 3A at a second timing.

Refer to FIGS. 3A and 3B. FIG. 3A is a schematic diagram of a projector 300 at a first timing according to according to another embodiment of the present invention. FIG. 3B is a schematic diagram of the projector 300 of FIG. 3A at a second timing.

The projector 300 includes a first light source 105, a second light source 110, a first color wheel 115, a second color wheel 120, a light guide tube 125, a first lens group 130, a DMD 135, a second lens group 140, a third lens group 150, a second dichroic mirror 155, a first reflector 160, a first dichroic mirror 165 and a second reflector 170.

The projector 300 of the present embodiment is different from the projector 100 in that the second optical path of the second color light L2 is shorter. For example, the second optical path of the second color light L2 of the present embodiment does not pass through the first reflector 160, such that the length of the second optical path of the second color light L2 can be reduced.

The optical elements through which the first optical path of the first color light L1, the second optical path of the second color light L2, the third optical path of the third color light L3 and the fourth optical path of the fourth color light L4 pass are disclosed below.

As indicated in FIG. 3A, at the first timing, the first optical path of the first color light L1 sequentially passes through the second dichroic mirror 155 and the first color wheel 115; the fourth optical path of the fourth color light L4 sequentially passes through the first color wheel 115 and the second dichroic mirror 155. In the present embodiment, regardless of the rotation angle of the first color wheel 115, the second light source 110 continuously emits a second color light L2 as indicated in FIGS. 3A and 3B. In another embodiment, the second light source 110 does not emit the second color light L2 when the transparent region T1 of the first color wheel 115 is not aligned with the first color light L1; the second light source 110 emits a second color light L2 only when the transparent region T1 of the first color wheel 115 rotates to is aligned with the first color light L1.

As indicated in FIG. 3B, at the second timing, the first optical path of the first color light L1 sequentially passes through the second dichroic mirror 155 and the first color wheel 115, the third optical path of the third color light L3 sequentially passes through the first dichroic mirror 165, the first reflector 160, the second reflector 170 and the second dichroic mirror 155; the second optical path of the second color light L2 sequentially passes through the first dichroic mirror 165, the first color wheel 115 and the second dichroic mirror 155.

The second color light L2 and the third color light L3 are guided towards a projecting direction D1 to be mixed as a first projecting light P1. Like the projector 100, the second color light L2 of the projector 300 of the present embodiment can compensate the light color of the third color light L3 (or the first color light L1).

Besides, the first dichroic mirror 165, the second dichroic mirror 155, the first reflector 160 and the second reflector 170 are disposed at four corners of a quadrilateral. The quadrilateral can be a rectangle or a square. For example, as indicated in FIGS. 3A and 3B, the first dichroic mirror 165 and the second reflector 170 are disposed corresponding to two corners in a diagonal of a rectangle, and the second dichroic mirror 155 and the first reflector 160 are disposed corresponding to two corners in another diagonal of the rectangle to implement the first optical path, the second optical path, the third optical path and the fourth optical path. However, the geometric positions of the second dichroic mirror 155, the first reflector 160, the first dichroic mirror 165, the second reflector 170 and/or other optical element are not subjected to specific restrictions in the embodiments of the present invention as long as the first optical path, the second optical path, the third optical path and the fourth optical path are implemented.

The flowchart of the projecting method of the projector 300 of the present embodiment is similar to that of FIG. 1C, and is not repeated here.

According to the projector and the projecting method using the same disclosed in above embodiments of the present invention, the second light source emits a second color light to compensate the color shift of the third color light (or the first color light), such that the light color of the mixed first projecting light can be converted to an expected light color. Besides, the position of the second light source is not limited to a specific position in the embodiments of the present invention as long as the second color light emitted by the second light source can be mixed with the third color light (or the first color light). Moreover, the optical path design of the first color light, the second color light, the third color light and the fourth color light is not subjected to specific restrictions in the embodiments of the present invention, and the optical path can be formed by various optical elements, such as reflectors, dichroic mirrors, lenses or other suitable optical elements as long as the second color light and the third color light (or the first color light) can be mixed. In an embodiment, the second color light is only mixed with the third color light and simultaneously guided towards the projecting direction to become the first projecting light.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A projector, comprising:
    a first light source configured to emit a first color light;
    a color wheel, comprising at least one transparent region and at least one phosphor reflection region; and
    a second light source configured to emit a second color light;
    wherein the color wheel is located on a first optical path of the first color light; the first color light passing through the at least one transparent region of the color wheel becomes a third color light; the first color light reflected by the at least one phosphor reflection region of the color wheel becomes a fourth color light; the second color light is only mixed with the third color light and simultaneously guided toward a projecting direction to become a first projecting light; the fourth color light guided towards the projecting direction becomes a second projecting light; the first projecting light and the second projecting light do not overlap in timing.

2. The projector according to claim 1, wherein the color wheel is located on the first optical path of the first color light and a second optical path of the second color light, and the second color light and the three color lights pass through the at least one transparent region of the color wheel in opposite directions.

3. The projector according to claim 2, wherein regardless of the rotation angle of the color wheel, the second light source continuously emits the second color light.

4. The projector according to claim 2, wherein the second light source does not emit the second color light when the at least one transparent region of the color wheel is not aligned with the first color light; the second light source emits the second color light when the color wheel rotates to make the at least one transparent region be aligned with the first color light.

5. The projector according to claim 1, wherein the color wheel is not located on a second optical path of the second color light.

6. The projector according to claim 5, wherein the second light source does not emit the second color light when the at least one transparent region of the color wheel is not aligned with the first color light; the second light source emits the second color light when the color wheel rotates to make the at least one transparent region be aligned with the first color light.

7. The projector according to claim 1, further comprising:
a first dichroic mirror located on a second optical path of the second color light, wherein the first dichroic mirror allows the second color light to pass through but reflects the third color light.

8. The projector according to claim 7, further comprising:
a second dichroic mirror, configured to reflect the first color light and the third color light but allow the second color light and the fourth color light to pass through;
a first reflector; and
a second reflector;
wherein the first optical path of the first color light sequentially passes through the second dichroic mirror and the color wheel; a third optical path of the third color light is sequentially reflected by the first reflector, the first dichroic mirror, the second reflector and the second dichroic mirror; a second optical path of the second color light sequentially passes through the first dichroic mirror, the first reflector, the color wheel and the second dichroic mirror.

9. The projector according to claim 8, wherein the first dichroic mirror and the second dichroic mirror are disposed corresponding to two corners of a diagonal of a rectangle, and the first reflector and the second reflector are disposed corresponding to two corners in another diagonal of the rectangle.

10. The projector according to claim 7, further comprising:
a second dichroic mirror, conjured to reflect the first color light and the third color light but allow the second color light to pass through;
a first reflector; and
a second reflector;
wherein the first optical path of the first color light sequentially passes through the second dichroic mirror and the color wheel; a third optical path of the third color light sequentially passes through the first dichroic mirror, the first reflector, the second reflector and the second dichroic mirror; a second optical path of the second color light sequentially passes through the first dichroic mirror, the color wheel and the second dichroic mirror.

11. The projector according to claim 10, wherein the first dichroic mirror and the second reflector are disposed corresponding to two corners in a diagonal of a rectangle, and the second dichroic mirror and the first reflector are disposed corresponding to two corners in another diagonal of the rectangle.

12. The projector according to claim 7, further comprising:
a second dichroic mirror, configured to reflect the first color light, the second color light and the third color light but allow the fourth color light to pass through;
a first reflector; and
a second reflector;
wherein the first optical path of the first color light sequentially passes through the second dichroic mirror and the color wheel; a third optical path of the third color light sequentially passes through the first reflector, the second reflector, the first dichroic mirror and the second dichroic mirror; a second optical path of the second color light sequentially passes through the first dichroic mirror and the second dichroic mirror.

13. The projector according to claim 12, wherein the second dichroic mirror and the second reflector are disposed corresponding to two corners in a diagonal of a rectangle, and the first dichroic mirror and the first reflector are disposed corresponding to two corners in another diagonal of the rectangle.

14. The projector according to claim 1, wherein the first color light is blue light, and the second color light is green light.

15. The projector according to claim 1, wherein the first light source is a blue light laser emitter, and the second light source is a light-emitting diode (LED).

16. A projecting method, comprising:
providing a projector comprising a first light source, a second light source and a color wheel, wherein the color wheel comprises at least one transparent region and at least one phosphor reflection region, and the color wheel is located on a first optical path of a first color light;
emitting the first color light by the first light source, wherein the first color light reflected by the phosphor reflection region of the color wheel becomes a fourth color light;
guiding the fourth color light towards a projecting direction to become a second projecting light;
emitting the first color light by the first light source, wherein the first color light passing through the at least one transparent region of the color wheel becomes a third color light;
emitting a second color light by the second light source; and
guiding the second color light to be only mixed with the third color light and simultaneously toward a projection direction to become a first projecting light, wherein the second projecting light and the first projecting light do not overlap in timing.

17. The projecting method according to claim 16, further comprising:
guiding the second color light and the three color lights to pass through the at least one transparent region of the color wheel in opposite directions.

18. The projecting method according to claim 17, wherein in the step of emitting the second color light by the second light source, regardless of the rotation angle of the color wheel, the second light source continuously emits the second color light.

19. The projecting method according to claim 16, wherein the color wheel is not located on a second optical path of the second color light.

* * * * *